United States Patent [19]
Norris

[11] 3,830,482
[45] Aug. 20, 1974

[54] ADJUSTABLE COIL SPRING LIFTER
[76] Inventor: Kenneth Edward Norris, Somerset, Colo. 81434
[22] Filed: Oct. 17, 1972
[21] Appl. No.: 298,355

[52] U.S. Cl. ............................ 267/61 R, 280/124 R
[51] Int. Cl. ............................................. B60g 11/14
[58] Field of Search............ 280/124 R; 267/60, 61, 267/61 S

[56] References Cited
UNITED STATES PATENTS
2,697,600   12/1954   Gregoire ......................... 267/61 R Primary Examiner—Philip Goodman

[57] ABSTRACT

The coil spring seat of an automobile suspension is provided with an adjustment bolt extending upwardly therefrom, and a ring and washer are positioned on the bolt between nuts. The ring is welded on the washer and protrudes axially into the coil spring which rests on the washer. Axial adjustment of the washer assembly will increase or decrease the loaded length of the spring to permit restoration of the loaded spring height.

2 Claims, 2 Drawing Figures

ADJUSTABLE COIL SPRING LIFTER

This invention relates to an adjustable coil spring base which may be used to compensate for loss of spring length due to spring fatigue.

When a coil spring is used as a body to chassis suspension spring in an automobile it is subjected to severe shock and cyclic loadings which cause the metal of the spring to fatigue, causing an excessive permanent set in the spring, thereby causing a reduction in the spring's loaded height.

Adverse effects on automobile performance caused by a lower than factory specified loaded spring height are the following:

1. Poor vehicle appearance.
2. Faulty headlight aiming.
3. Apparent shock absorber inefficiency.
4. Excessive wear to front end parts due to poor front end geometry.
5. Inability to align front end of automobile.
6. Poor automobile riding and handling characteristics.

It is an object of this invention to provide a means of adjustment to restore a coil spring to its original height by an adjustable base underneath of the spring which does not interfere with the geometric characteristics of the spring, as do spacers between the coils.

Another object of this invention is to be compact in size and compatable with the automobile suspension components, thereby not interferring with the normal operating paths of the other components.

Yet another object of this invention is to be of a permanent fixed nature requiring no maintenance under all loading and operating conditions.

Referring to the drawings.

Figure 2:
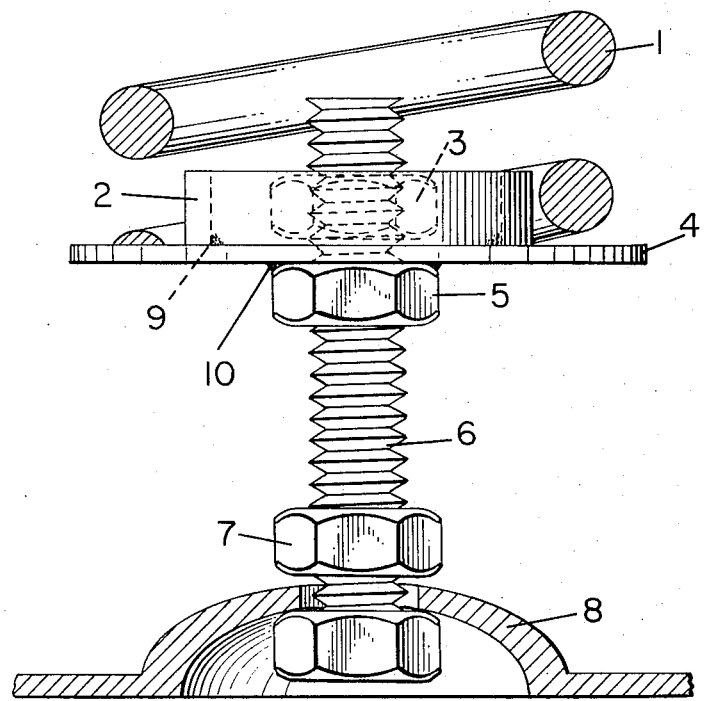
FIG. 2 is an elevation view showing the spring positioned on the "Adjustable Coil Spring Lifter" as installed in an automobile.

Referring to the drawings and particularly to FIG. 2, it is apparent that with a coil spring 1 such as that utilized in an automobile suspension, the coil spring 1 is preformed to retain a certain load and provide a certain spacing between coils to insure good riding characteristics for the automobile. The coil spring 1 will change after continued shock and cyclic loading fatigue, causing an increased permanent set, which will shorten the loaded length of the spring thereby altering the riding and handling characteristics of the automobile. To restore the loaded spring height, the spring 1 is raised by insertion of an adjustable spring lifter underneath of the spring.

Figure 1:
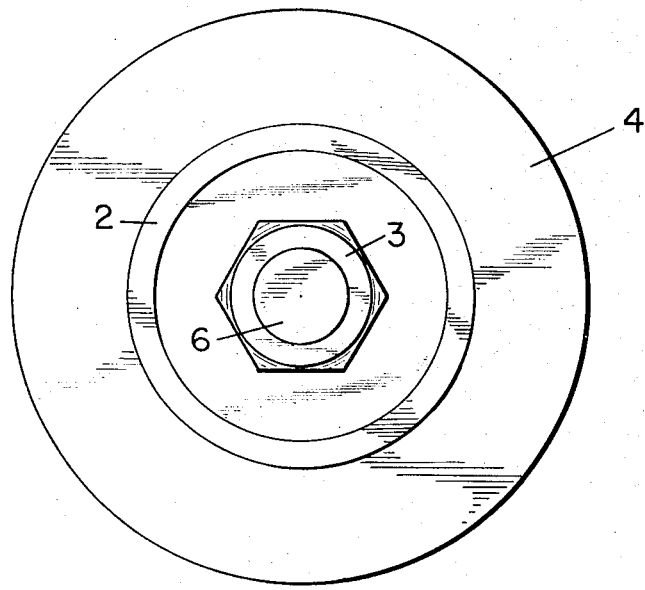
FIG. 1 is a plan view of the "Adjustable Coil Spring Lifter,"

This invention contemplates a particular design of an adjustable spring base and is concerned with the form shown in FIGS. 1 and 2.

Referring to FIG. 2, the coil spring 1 rests on the bearing surface of the washer 4 which transmits the load to the height adjustment nut 5 which through a threaded engagement with the threaded bolt or threaded rod 6 transmits the load through the threaded bolt or threaded rod 6 through the support nut 7 to the axle spring seat 8 of the automobile. The ring 2 rests on the washer 4 and protrudes axially into the center of the coil spring 1 to retain the spring 1 on the washer 4. The ring 2 is attached to the washer 4 by a weld 9 on the inside of the ring 2 to the top face of the washer 4. The washer 4 may or may not be attached to the height adjustment nut 5 by a weld 10. The bolt 6 may be replaced by a threaded rod 6 with a nut on the bottom end. The lifter is connected to the axle spring seat 8 by a bolted connection. For certain designs of coil spring attachment where the spring 1 is bolted to the axle spring seat 8, with this invention the spring 1 may be bolted to the washer 4 by the hold down nut 3 with the original spring mounting washer as supplied by the automobile manufacturer.

Axial adjustment of the invention is attained by rotating the washer assembly (ring 2, washer 4, and height adjustment nut 5) while keeping the bolt or threaded rod 6 stationary. When the invention is underneath of the spring 1, rotation of the washer assembly relative to the bolt or threaded rod 6 will produce an axial increase or decrease in the length of the invention thereby effectively increasing or decreasing the loaded length of the coil spring. Either right or left hand threads for the bolt or threaded rod 6 may be used.

What is claimed is:

1. In a suspension mechanism of the class described, a spring seat for automobile coil suspension springs, with said device fitting underneath and partially inside of the coil spring with the bottom edge of the bottom coil of the spring supported on the upper horizontal bearing surface created by the washer which is solidly attached to the top surface of the adjustment nut, the washer and nut assembly retaining position under the spring by a ring solidly attached at the lower surface to the top surface of the bearing washer with the ring protruding axially upward into the bottom convolution of the spring, with resistance to horizontal relative movement between the spring and ring, washer, nut assembly coming from radial contact of the outside surface of the ring with the inside surface of the bottom coil of the spring, where the ring, washer, and nut all share a common concentric vertical axis.

2. In a suspension mechanism of the class described, an attachment mechanism for the unsprung terminal portion of a suspension coil spring compensating device attached to the axle spring seat by a vertically bolted connection through the hole in the horizontal coil spring seat, with the axle spring seat clamped between the bolt head on the lower end of the support column and the support nut on the support column, where the support column supports the load supported by the coil spring in its entirety with the load supported by the support column being transmitted entirely to the spring seat through the threaded connection between the support column and the support nut and from the lower surface of the support nut to the upper surface of the axle spring seat.

* * * * *